Aug. 13, 1957   A. F. SEBREE   2,802,557
SELF RELEASABLE CLUTCH
Filed March 16, 1955   4 Sheets-Sheet 2

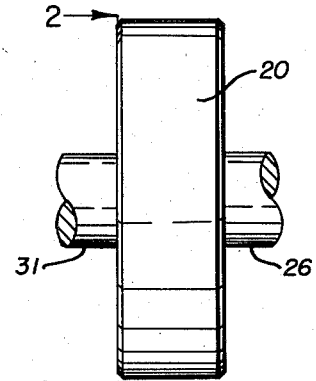
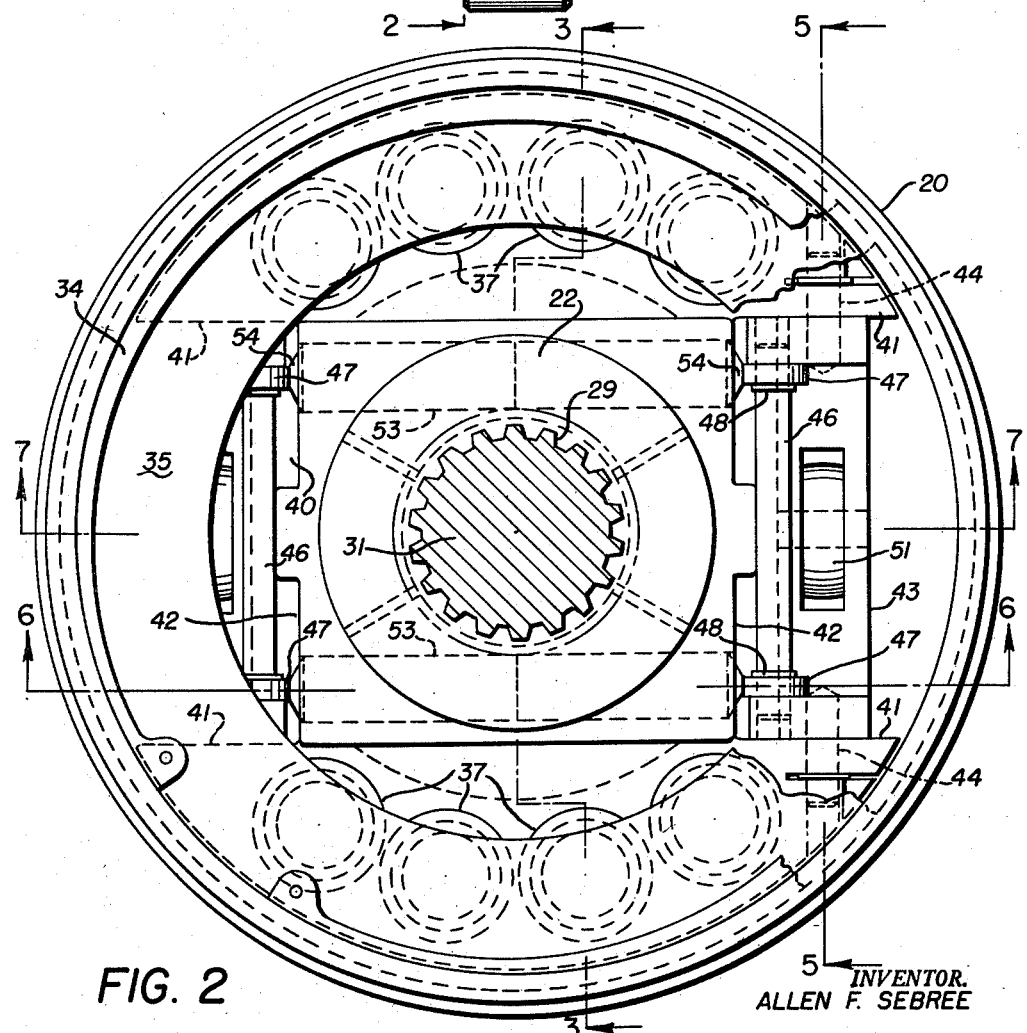

INVENTOR.
ALLEN F. SEBREE
BY
ATTORNEY

INVENTOR.
ALLEN F. SEBREE
BY
ATTORNEY

Aug. 13, 1957 A. F. SEBREE 2,802,557
SELF RELEASABLE CLUTCH
Filed March 16, 1955 4 Sheets-Sheet 4

INVENTOR.
ALLEN F. SEBREE
BY
ATTORNEY

United States Patent Office 2,802,557
Patented Aug. 13, 1957

2,802,557
SELF RELEASABLE CLUTCH

Allen F. Sebree, Cleveland, Ohio, assignor to Cleveland Rock Drill Division, Westinghouse Air Brake Company, Pittsburgh, Pa., a corporation of Pennsylvania Application March 16, 1955, Serial No. 494,622

10 Claims. (Cl. 192—56)

This invention relates broadly to self releasing clutches or couplings of the interengaging teeth or jaws type, and is concerned primarily with the problem of preventing the teeth to slit or ratchet over each other upon disengagement or re-engagement of the clutch members.

One object of this invention is to provide a self releasing clutch of the interengaging jaws type with simple and efficient means preventing the jaws to ratchet over each other and wear or break upon disengagement or re-engagement of the clutch members.

Another object of this invention is to provide a self releasing clutch for the transmission of torque up to a predetermined value, with means preventing re-engagement of the clutch members as long as the speed of one of the members remains above a predetermined maximum.

Another object of this invention is to provide a self releasing clutch mechanism of the interengaging jaw type with means coupled with one of the clutch members for automatically maintaining the separation of the members after release and to hold them out of operative engagement as long as the driver is rotated at a rate of speed exceeding a predetermined maximum.

With the above and other objects in view the invention may be said to comprise the device as illustrated in the accompanying drawings hereinafter described and particularly set forth in the appended claims, together with such variations and modifications thereof as will be apparent to any one skilled in the art to which the invention appertains. Reference should be had to the accompanying drawings forming a part of the specification, in which:

Figure 1 is a small side view of the clutch assembly embodying the invention.

Figure 2 is an enlarged end view of the clutch mechanism looking in the direction of the arrows 2—2 in Figure 1.

Figure 3:
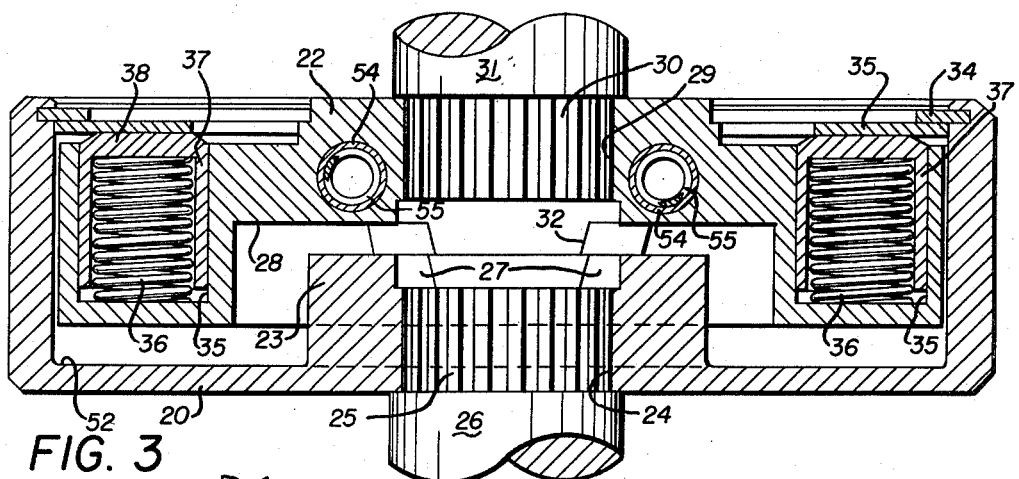
Figure 3 is a longitudinal sectional view taken on line 3—3 in Figure 2.
Figure 4:
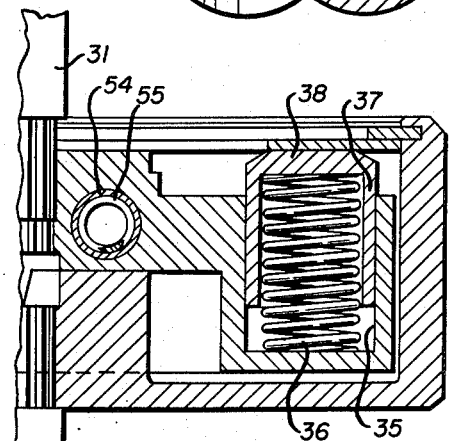
Figure 4 represents a portion of Figure 3, with some parts shown in a different position.

Referring to the drawings, the mechanism comprises a driven clutch member 20 and a driving clutch member 22. Both members are substantially cylindrical with the driving one fitted for rotation within the driven one. Driven member 20 is cup shaped with a centrally raised portion or hub 23 having a splined bore 24 extending centrally therethrough and adapted to fit over the correspondingly splined end 25 of a shaft 26. On its face surrounding the bore 24, hub 23 is provided with two pairs of diametrically opposed radially extending jaws 27, all formed with outwardly inclined side walls.

The driving member 22 is thinner than the depth of the driven member 20, and its inner central portion is recessed as at 28 to provide room for the hub 23. A splined bore 29 also extends centrally through the member 22 to fit on the correspondingly splined end 30 of a driving shaft 31. Surrounding the bore 29, the bottom of the recess 28 is provided with two pairs of diametrically opposed radially extending jaws 32, all formed with outwardly inclined side faces and adapted to mesh with the jaws 27 in driving engagement therewith.

The driving member 22 is retained within the driven member 20 by a split spring ring 34 grooved within the upper end of the driven member and having its underside engaged by a relatively large washer 35. The body of the driving member is provided with two sets of diametrically opposed, cylindrical flat bottom sockets 35. As shown in Figure 2, these sockets are disposed circularly near the outer edge of the member with four sockets in each of the set, and as shown in Figure 3 with the sockets opening under the washer 34. Each socket 35 accommodates a compression spring 36 having one end engaging the bottom of the socket, and the other end engaging the bottom of an inverted cup 37 slidably guided within the socket, and having its outer end 38 engaging the underside of the washer 35. Springs 36 are thereby exerting axial forces on the members tending to move them axially toward each other and into operating engagement of the jaws 27 and 32.

Figure 5:
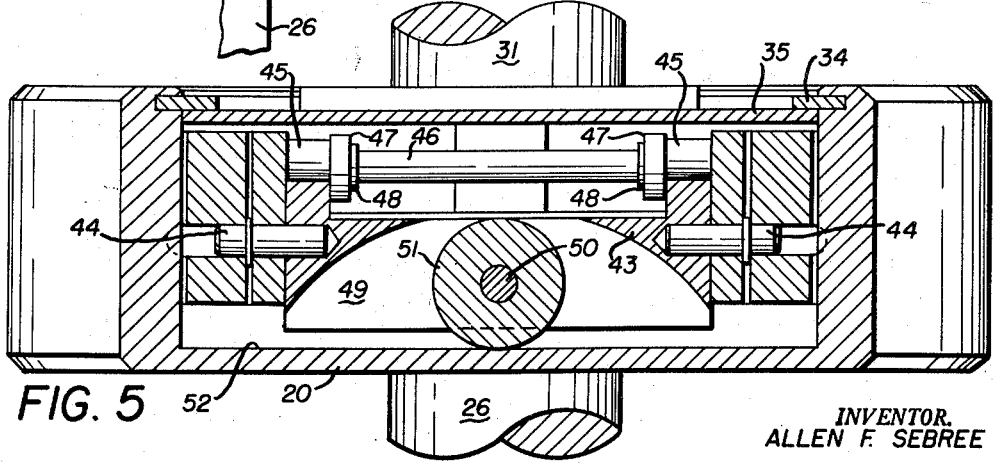
Figure 5 is a longitudinal sectional view taken on line 5—5 in Figure 2.
Figure 6:
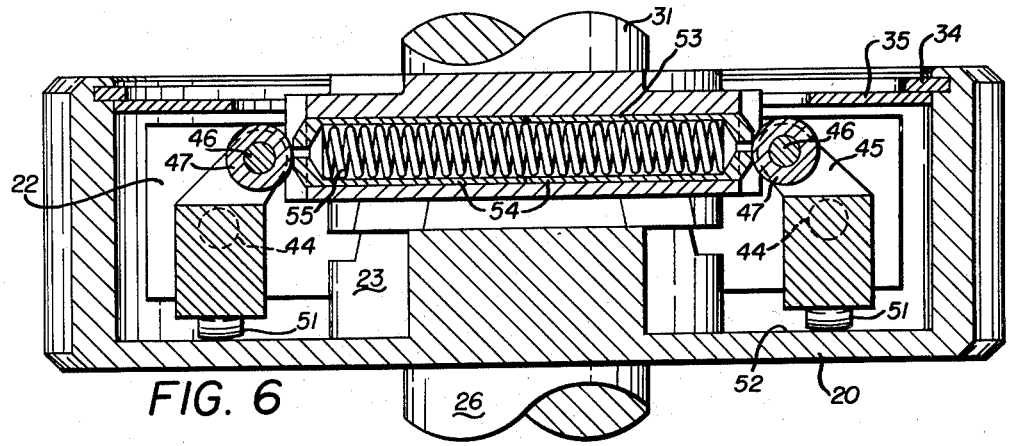
Figure 6 is a cross sectional view taken on line 6—6 in Figure 2.
Figure 8:
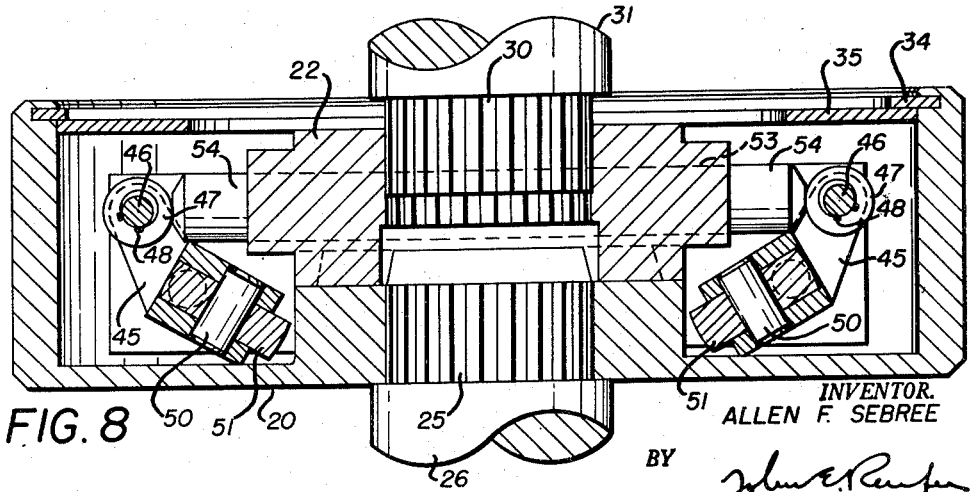

Between the two sets of sockets 35, the body of member 22 is shaped into two diametrically opposed open yokes 40, Figure 2, each having two parallel side walls 41 and a cross wall 42. A roller carrying element or bracket 43 is pivotally supported on pins 44, which protrude coaxially from the side walls 41 of each yoke, thereby enabling swinging movement of the brackets on axes perpendicular to but offset from the center axes of the clutch members. Bracket 43 is of substantially rectangular cross section and has, near the ends thereof, two lugs 45 extending angularly inward from its upper end as seen in Figure 6. Both lugs have their upper ends apertured to receive the ends of a shaft 46, which extends between the lugs, and carries adjacent each lug, a small roller 47 retained axially in one direction by the lug and in the other direction by a spring clip 48 grooved on the shaft 46. As shown in Figure 5, each bracket 43 is provided with a relatively large slot 49, transversed by a cross pin 50 carried by the bracket, and having rotatably supported thereon a roller 51 fitted within the slot and engageable with the bottom wall 52 of the driven member 20. This roller is preferably equally spaced from the ends of the bracket for rotation on an axis perpendicular to the axis of rotation of the clutch members. Driving clutch member is also provided with two parallel bores 53, one on each side of its central bore 29, and opening perpendicularly on the cross walls 42 of the yokes 40. Each bore has slidably mounted therein a pair of hollowed plungers 54, urged outwardly or away from each other by a compression spring 55 housed within the plungers. The outer ends of the plungers within one bore, are in operative engagement with the aligned rollers 47 of the two shafts 46, thereby imparting a rotary force on the brackets 43 in an outward direction relative to the center axis of the clutch members to cause the brackets to normally assume the position shown in Figure 8, with the rollers 51 out of engagement with the bottom 52 of the driven member.

Figure 9:
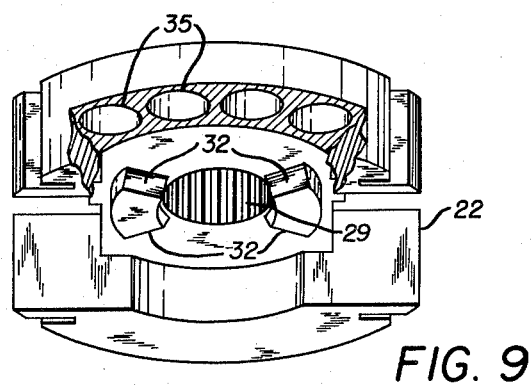
Figure 9 is a reduced view in perspective, partly broken away, of the driven clutch member.
Figure 10:
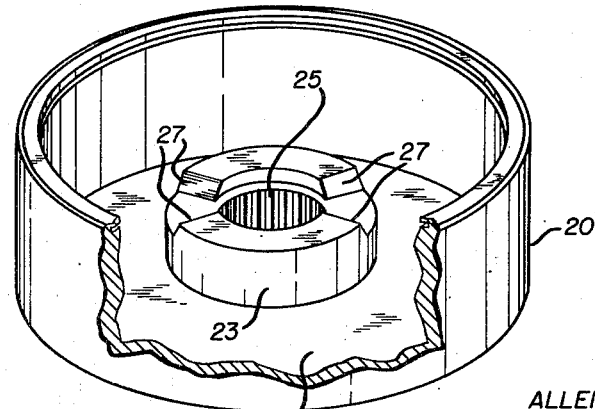
Figure 10 is a reduced view in perspective, partly broken away, of the driving clutch member.

In the operation of the clutch mechanism, as the springs 36 exert axial pressure on the clutch members 20 and 22 to urge them toward each other, upon initial rotation of the driving member 22, the jaws 32 of the driving member, which as shown in Figure 9, are in the form of protuberances or lugs extending from the bottom of the recess 28, will fall between the jaws 27 of the driven member. Upon interengagement of the jaws 27 and 32, rotation from the driving member 22 is transmitted to the driven member 20 and therefrom to the shaft 26 to perform its intended work. As the clutch members 20 and 22 are rotated at relatively high speed, the resulting centrifugal force acting on the brackets 43 tends to move them outwardly. However this force is not capable of overcoming the combined forces of the springs 36 and 55, thereby causing the roller carrying brackets 43 to remain in the retracted position shown in Figure 8 during normal operative engagement of the clutch members, which engagement will continue as long as the torque between the members remains below a predetermined maximum. As previously explained, the interengaging faces of the jaws 27 and 32 are inclined so that they may slip to disengage the clutch members 20 and 22 when the torque aforesaid exceeds a predetermined maximum. In such instance, the jaws 32 of the driving member 22 will begin to slide over the jaws of the driven member and force the driving member axially outward against the springs 36. At the time the inclined faces of the jaws 72 and 32 have cleared and the jaws are disengaged, the distance between the center axes of the pins 44 on which the brackets 43 are pivotally mounted and the bottom 52 of the driven member, is sufficient to enable pivotal movement or extension of the brackets 43 into the position shown in Figure 7. This extension or outward swinging motion of the brackets 43 is effected by centrifugal force set up in the rotation of the driving member 22 and acting on the brackets, against the forces of the springs 55, by causing inward movement of the plungers 54. As the clutch is released, that is the members 20 and 22 are disengaged, the driving member 22 is free to rotate at full speed, thereby causing the brackets 43 to remain extended with the rollers 51 in rolling engagement with the bottom 52 of the driven clutch member to prevent re-engagement of the clutch members.

From the foregoing description, it will be understood that once released the clutch can not be re-engaged as long as the driving member continues to rotate at a rate of speed greater than a predetermined maximum. When it is desired to re-engage the clutch, it is first necessary to stop or at least slow down the driving member 22, thereby eliminating the effect of centrifugal force previously acting on the brackets 43 and enabling the spring biased plungers 54 to act on the rollers 47 for swinging the rollers 49 into retracted position. Thereafter, upon initial rotation of the driving member 22, the springs 36 will cause the clutch members to once more move toward each other for operative engagement of the jaws 27 and 32.

It will also be understood that the torque that can be transmitted through the clutch is a function of the force of the springs 36 combined with the extent of inclination of the side faces of the jaws 27 and 32, thus by varying the size of the springs and the angle of the side faces of the jaws, it is possible to change the output torque of the clutch.

Figure 7:
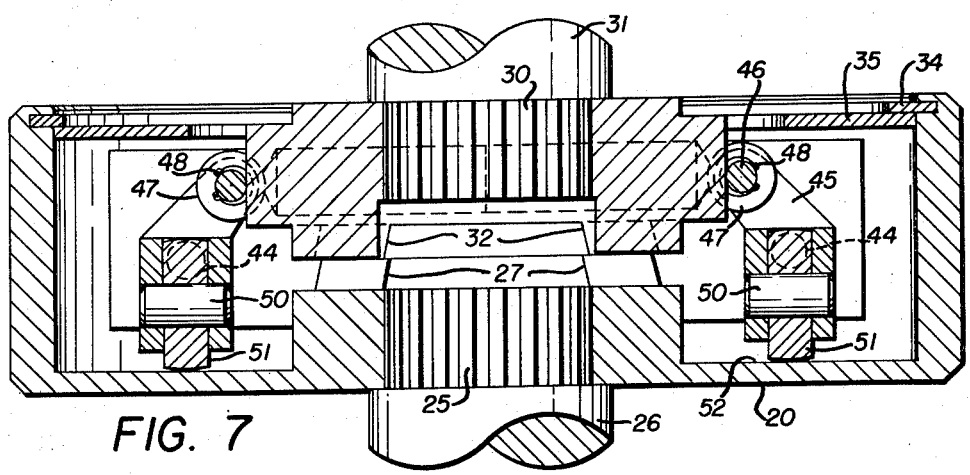
Figures 7 and 8 are cross sectional views taken on line 7—7 in Figure 2 and showing parts in different positions.

In practice, the bracket assemblies 43 are proportioned so that when they are in the extended position shown in Figure 7, the clutch members are separated with a slight axial clearance between the jaws 27 and 32, thereby preventing the jaws from ratcheting over each other during rotation of the driving member 22 relative to the driven member 20.

The details of structure and arrangement of parts shown and described may be variously changed and modified without departing from the spirit and scope of the invention.

I claim:

1. In a self releasing clutch, a driving member having rotation imparted thereto and a driven clutch member axially aligned therewith, said members having interengaging clutch jaws on their opposed faces, spring means normally effecting and maintaining operative engagement of said jaws, means responsive to the development of a predetermined torque between said members to effect release of said jaws, and means connected to said driving member for rotation therewith movable in response to centrifugal force into engagement with said driven member for maintaining said members in jaws released position.

2. In a self releasing clutch, a driving member having rotation imparted thereto and a driven clutch member axially aligned therewith, said members having interengaging clutch jaws on their opposed faces, spring means normally effecting and maintaining operative engagement of said jaws, means responsive to the development of a predetermined torque between said members to effect release of said jaws, and means pivotally carried by said driving member for rotation therewith movable into rolling engagement with said driven member by centrifugal force set up in the rotation of said driving member for maintaining said members in jaws released position.

3. In a self releasing clutch, a driving member having rotation imparted thereto and a driven clutch member axially aligned therewith, said members having interengaging clutch jaws on their opposed faces, spring means normally effecting and maintaining operative engagement of said jaws, means responsive to the development of a predetermined torque between said members to effect their axial separation and the release of said clutch jaws, swinging means carried by said driving member adapted to extend into rolling engagement with said driven member in response to said axial separation and to a speed of said driving member above a certain maximum, to prevent re-engagement of said clutch jaws, and spring means effecting retraction of said swinging means when said speed falls below said maximum.

4. In a self releasing clutch, a driving member having rotation imparted thereto and a driven clutch member axially aligned therewith, said members having interengaging clutch jaws on their opposed faces, spring means normally effecting and maintaining operative engagement of said jaws, means responsive to the development of a predetermined torque between said members to effect axial movement of one of said members in one direction and the release of said jaws, and means interposed between said members pivotally carried by said driving member for rotation therewith responsive to centrifugal force to engage said driven member and prevent said axial movement in the other direction as long as said driving member rotates relative to said driven member at a greater rate of speed than a predetermined maximum.

5. In a self releasing clutch, a driving member having rotation imparted thereto and a driven clutch member axially aligned therewith, said members having interengaging clutch jaws on their opposed faces, spring means normally effecting and maintaining operative engagement of said jaws, means responsive to the development of a predetermined torque between said members to effect axial movement of one of said members in one direction and the release of said jaws, releasable locking elements between said clutch members pivotally connected to said driving clutch member for rotation therewith, said elements being movable into first and second positions to prevent and permit respectively said axial movement in the other direction and re-engagement of said jaws, movement in said first position being responsive to centrifugal force, and spring means between said elements active thereon to effect their movement into said second position.

6. In a clutch a driving clutch member having rotation imparted thereto and a driven clutch member axially aligned therewith, said members having interengaging clutch jaws on their opposed faces, spring means normally effecting and maintaining operative engagement of said jaws, inclined interengaging faces on said jaws responsive to the development of a predetermined torque between said members to effect release of said jaws, roller means connected to said driving member for rotation therewith movable outwardly into engagement with said driven member to prevent re-engagement of said jaws, outward movement of said roller means being responsive to centrifugal force, and spring means for effecting inward movement of said roller means to permit re-engagement of said roller means.

7. In a self releasing clutch, a pair of axially aligned clutch members having interengaging clutch jaws on their opposed faces, spring means normally effecting and maintaining operative engagement of said clutch jaws, means responsive to the development of a predetermined torque between said clutch members to effect release of said jaws, and means connected to one of said members for rotation therewith automatically engageable with the other member under certain conditions of operation for preventing re-engagement of said jaws.

8. In a self releasing clutch, a driving and a driven axially aligned clutch members having interengaging clutch jaws on their opposed faces, spring means normally effecting and maintaining operative engagement of said clutch jaws, means responsive to the development of a predetermined torque between said clutch members to effect release of said jaws, and means connected to said driving member for rotation therewith movable into rotary engagement with said driven member under certain conditions of operation for preventing re-engagement of said jaws.

9. In a self releasing clutch, a driving and a driven axially aligned clutch members having interengaging clutch jaws on their opposed faces, spring means normally effecting and maintaining operative engagement of said clutch jaws, means responsive to the development of a predetermined torque between said clutch members to effect release of said jaws, and means self contained within and carried by said driving member for pivotal movement on parallel axes perpendicular to but offset from the rotary axis of said members and automatically engageable with said driven member by virtue of the centrifugal force set up in the rotation of said driving member for preventing re-engagement of said jaws.

10. In a self releasing clutch, a driving and a driven axially aligned clutch members one fitted within the other having interengaging clutch jaws on their opposed faces, spring means normally effecting and maintaining operative engagement of said clutch jaws, means responsive to the development of a predetermined torque between said clutch members to effect release of said jaws, and roller means self contained within and carried by said driving member on axes perpendicular to the rotary axis of said members and automatically engageable with said driven member under certain conditions of operation for preventing re-engagement of said jaws.

References Cited in the file of this patent

UNITED STATES PATENTS

| | | |
|---|---|---|
| 504,479 | Ross | Sept. 5, 1893 |
| 1,537,628 | Street | May 12, 1925 |
| 2,587,712 | Dodge | Mar. 4, 1952 |